US009234776B2

United States Patent
Strei

(10) Patent No.: US 9,234,776 B2
(45) Date of Patent: *Jan. 12, 2016

(54) MULTIVARIABLE PROCESS FLUID TRANSMITTER FOR HIGH PRESSURE APPLICATIONS

(71) Applicant: Rosemount Inc., Chanhassen, MN (US)

(72) Inventor: David Matthew Strei, Waconia, MN (US)

(73) Assignee: Rosemount Inc., Chanhassen, MN (US)

(*) Notice: Subject to any disclaimer, the term of this patent is extended or adjusted under 35 U.S.C. 154(b) by 201 days.

This patent is subject to a terminal disclaimer.

(21) Appl. No.: 14/037,805

(22) Filed: Sep. 26, 2013

(65) Prior Publication Data

US 2015/0082903 A1    Mar. 26, 2015

(51) Int. Cl.
| | |
|---|---|
| G01F 1/34 | (2006.01) |
| G01F 1/50 | (2006.01) |
| G01L 15/00 | (2006.01) |
| G01L 19/00 | (2006.01) |
| G01F 15/00 | (2006.01) |
| G01F 15/14 | (2006.01) |

(52) U.S. Cl.
CPC ............... *G01F 1/50* (2013.01); *G01F 15/006* (2013.01); *G01F 15/14* (2013.01); *G01L 15/00* (2013.01); *G01L 19/0046* (2013.01); *G01L 19/0092* (2013.01)

(58) Field of Classification Search
None
See application file for complete search history.

(56) References Cited

U.S. PATENT DOCUMENTS

| | | | |
|---|---|---|---|
| 5,000,047 A | 3/1991 | Kato et al. | |
| 5,022,270 A | 6/1991 | Rud, Jr. | 73/706 |

(Continued)

FOREIGN PATENT DOCUMENTS

| | | |
|---|---|---|
| CN | 1131462 | 9/1996 |
| CN | 1447096 | 10/2003 |

(Continued)

OTHER PUBLICATIONS

Product Data Sheet 00813-0100-4716, Rev. LA, Rosemount 3095 MultiVariable "The Proven Leader in Multivariable Mass Flow Measurement", dated Dec. 31, 2008.

(Continued)

*Primary Examiner* — Harshad R Patel
(74) *Attorney, Agent, or Firm* — Westman, Champlin & Koehler, P.A.

(57) ABSTRACT

A multivariable process fluid transmitter module includes a base having a pair of recesses. A pair of pedestals is provided with each pedestal being disposed in a respective recess and being coupled to a respective isolation diaphragm. At least one line pressure assembly is mounted proximate one of the pedestals. The at least one line pressure assembly couples a respective isolation diaphragm to a line pressure sensor. A differential pressure sensor has a sensing diaphragm fluidically coupled to the isolation diaphragms by a fill fluid. At least one additional sensor is disposed to sense a temperature of a process fluid. Circuitry is coupled to the line pressure sensor, the differential pressure sensor, and the at least one additional sensor to measure an electrical characteristic of each of the line pressure sensor, the differential pressure sensor, and the at least one additional sensor. The circuitry is configured to provide an indication of fluid flow based on the measured electrical characteristic of each of the line pressure sensor, the differential pressure sensor and the at least one additional sensor.

16 Claims, 3 Drawing Sheets

(56) References Cited

U.S. PATENT DOCUMENTS

| | | | |
|---|---|---|---|
| 5,212,989 A | 5/1993 | Kodama et al. | 73/706 |
| 5,524,492 A | 6/1996 | Frick et al. | 73/706 |
| 5,637,802 A | 6/1997 | Frick et al. | 73/724 |
| 5,665,899 A | 9/1997 | Willcox | 73/1.63 |
| 5,668,322 A | 9/1997 | Broden | 73/756 |
| 5,680,109 A | 10/1997 | Lowe et al. | 340/608 |
| 5,731,522 A | 3/1998 | Sittler | 73/708 |
| 6,079,276 A | 6/2000 | Frick et al. | 73/718 |
| 6,082,199 A | 7/2000 | Frick et al. | 73/724 |
| 6,089,097 A | 7/2000 | Frick et al. | 73/718 |
| 6,151,557 A * | 11/2000 | Broden et al. | 702/47 |
| 6,253,624 B1 * | 7/2001 | Broden et al. | 73/861.44 |
| 6,425,290 B2 | 7/2002 | Willcox et al. | 73/715 |
| 6,457,367 B1 | 10/2002 | Behm et al. | |
| 6,473,711 B1 | 10/2002 | Sittler et al. | 702/138 |
| 6,480,131 B1 | 11/2002 | Roper et al. | 341/155 |
| 6,484,585 B1 | 11/2002 | Sittler et al. | 73/718 |
| 6,505,516 B1 | 1/2003 | Frick et al. | 73/718 |
| 6,508,129 B1 | 1/2003 | Sittler | 73/756 |
| 6,516,671 B2 | 2/2003 | Romo et al. | 73/718 |
| 6,520,020 B1 | 2/2003 | Lutz et al. | 73/706 |
| 6,561,038 B2 | 5/2003 | Gravel et al. | 73/729.2 |
| 6,843,139 B2 | 1/2005 | Schumacher et al. | 73/861.52 |
| 6,848,316 B2 | 2/2005 | Sittler et al. | 73/706 |
| 6,966,229 B2 | 11/2005 | Seegberg | 73/754 |
| 7,036,381 B2 | 5/2006 | Broden et al. | 73/708 |
| 7,962,294 B2 | 6/2011 | Dozoretz et al. | 702/50 |
| 8,122,771 B2 | 2/2012 | Seegberg et al. | 73/756 |
| 2002/0023499 A1 | 2/2002 | Boehler et al. | |
| 2002/0100333 A1 | 8/2002 | Gravel et al. | 73/756 |
| 2003/0117837 A1 | 6/2003 | Park et al. | 365/158 |
| 2003/0177837 A1 | 9/2003 | Broden et al. | |
| 2005/0193825 A1 | 9/2005 | Otsuka | |
| 2005/0248434 A1 | 11/2005 | Kurtz et al. | 338/42 |
| 2006/0162458 A1 | 7/2006 | Broden | |
| 2008/0006094 A1 | 1/2008 | Schulte et al. | 73/736 |
| 2008/0053242 A1* | 3/2008 | Schumacher | 73/861.42 |
| 2008/0245158 A1 | 10/2008 | Hedtke | |
| 2009/0000393 A1 | 1/2009 | Nyfors et al. | |
| 2009/0165424 A1 | 7/2009 | Lutz | |
| 2009/0293625 A1 | 12/2009 | Sundet et al. | 73/708 |
| 2010/0198547 A1 | 8/2010 | Mulligan et al. | |
| 2012/0079884 A1 | 4/2012 | Broden et al. | |
| 2013/0074604 A1 | 3/2013 | Hedtke et al. | |
| 2013/0160560 A1* | 6/2013 | Strei et al. | 73/706 |
| 2014/0213103 A1 | 7/2014 | Ohmeyer et al. | 439/571 |
| 2015/0000417 A1 | 1/2015 | Hedtke et al. | 73/724 |

FOREIGN PATENT DOCUMENTS

| | | |
|---|---|---|
| CN | 1777790 | 5/2006 |
| CN | 102162762 | 8/2011 |
| CN | 203069314 | 7/2013 |
| DE | 10 2010 041 170 | 3/2011 |
| EP | 1 116 943 | 6/2013 |
| WO | 95/08759 A1 | 3/1995 |
| WO | WO 01/61219 | 8/2001 |
| WO | WO 2010/141655 | 12/2010 |
| WO | WO 2011/000423 | 1/2011 |

OTHER PUBLICATIONS

Notification of Transmittal of the International Searching Report and the Written Opinion of the International Searching Authority from PCT/US2014/049019, dated Jan. 20, 2015.
Office Action for U.S. Appl. No. 13/630,547, dated Aug. 22, 2014, 7 pages.
Invitation to Pay Additional Fees for International Application No. PCT/US2014/052660, dated Dec. 18, 2014.
International Search Report and Written Opinion of the International Searching Authority for International Application No. PCT/US2014/040632, dated Dec. 3, 2014.
Office Action from Chinese Application No. 201210506130.3, dated Jan. 14, 2015.
International Search Report and Written Opinion of the International Searching Authority dated Jun. 5, 2013 for International Application No. PCT/US2012/070545, filed Dec. 19, 2012.
General Specifications EJX110A Differential Pressure Transmitter, Jan. 1, 2009. Retrieved from Internet : http://web.archive.org/web/20090407093933/http://www.yokogawa.com/fld/pdf/ejx/GS01C25B01-01E.pdf.
Hibner, E.L. and L.E. Shoemaker: "The Advantages of Nickel Alloys for Seawater Service, a New Generation of High Strength, Corrosion-Resistant Superalloy Products for Military Springs, Fasteners and Hardware". Special Metals Corporation, Huntington, WV 25705.
Fuji Electric—Differential Presure Transmitters for the Oil and Gas Industry. www.offshore-technology.com/contractors/instrumentation/fuji-electric/fuji-electric1.html.
"Application of Hardgrove Alloy C-276 Material in Chemical Pressure Vessel", by Li, Petrochemical Design, col. 20, No. 1, pp. 36-38, Dec. 31, 2003.
Office Action from Australian Application No. 2012359068, dated Jul. 15, 2014.
Office Action from Chinese Application No. 2012105061303, dated Jun. 10, 2014.
Office Action from European Application No. 12809549.4, dated Jul. 29, 2014.
Invitation to Pay Additional Fees for International Application No. PCT/US2013/029064, dated Apr. 16, 2014.
International Search Report and Written Opinion of the International Searching Authority for International Application No. PCT/US2013/029064, dated May 28, 2014.
Patent Examination Report No. 1 for Australian Patent Application No. 2013230135, dated Nov. 26, 2014, 3 pages.
Communication pursuant to Rules 161(1) and 162 EPC for European Patent Application No. 13710942.7-1610, dated Dec. 2, 2014, 2 pages.
Office Action from Australian Patent Application No. 2013230135, dated Apr. 2, 2015. Office Action from Australian Patent Application No. 2013230135, dated Apr. 2, 2015.
Office Action from Chinese Application Serial No. 201380007242.7, dated Apr. 28, 2015.

* cited by examiner

MULTIVARIABLE PROCESS FLUID TRANSMITTER FOR HIGH PRESSURE APPLICATIONS

BACKGROUND

Industrial process control systems are used to monitor and control industrial processes that produce or transfer fluids or the like. In such systems, it is typically important to measure "process variables" such as temperatures, pressures, flow rates, and others. Process variable transmitters are used to measure such process variables and transmit information related to the measured process variable back to a central location such as a central control room.

A process variable transmitter generally includes or is coupled to a transducer or sensor that responds to a process variable. A process variable generally refers to a physical or chemical state of matter or conversion of energy. Examples of process variables include pressure, temperature, flow, conductivity, pH and other properties. Pressure is considered to be a basic process variable that can be used to measure flow, level and even temperature.

In order to measure a fluid flow, it is often necessary to determine a number of process variables, such as process fluid temperature, process fluid static or line pressure, and process fluid differential pressure across a partial obstruction, such as an orifice plate or the like. In such instances, multivariable transmitters are commonly used to measure and monitor a plurality of process variables in order to provide calculated parameters, such a process fluid flow. Such calculated parameters are useful relative to various industrial process fluids, such as slurries, liquids, vapors and gases of chemical, pulp, petroleum, gas, pharmaceuticals, food and other fluid-type processing plants.

Multivariable process fluid transmitters generally include a differential pressure sensor as well as a line pressure sensor and/or a process fluid temperature sensor. The differential pressure sensor responds to a difference in pressure between two process fluid inputs. The line pressure sensor responds to the absolute or gauge pressure in one of the fluid inputs. The process fluid temperature sensor responds to the temperature of the process fluid with an electrical indication, such as a voltage or resistance, that is related to the temperature of the process fluid.

In multivariable process fluid transmitters that include a differential pressure sensor, such transmitters typically include a pair of isolator diaphragms that are positioned in the process fluid inlets and isolate the differential pressure sensor from the harsh process fluids being sensed. Pressure is transferred from the process fluid to the differential pressure sensor through a substantially incompressible fill fluid carried in a passageway extending from each isolator diaphragm to the differential pressure sensor.

High static pressure environments can provide significant challenges for process fluid transmitters. In some cases, the bolted connection between the process fluid flange and the process variable transmitter base typically cannot seal at such high pressures due to stress limitations of the bolts and deformable seals used therebetween. When the seal is deformed or otherwise disrupted, process fluid may leak from the coupling. Currently, multivariable process fluid transmitters are not able to operate in environments rated to high line pressures, such as 15,000 psi. Thus, current multivariable devices are not generally suitable for some process environments such as subsea use. Accordingly, in such environments, when a flow measurement or other similar measurement is desired which requires multiple process variables, multiple process fluid transmitters, such as two and sometimes three process fluid transmitters are required. Providing such transmitters involves considerable expense. Thus, for growing high-pressure markets, such as subsea oil and gas wells, it is desirable to provide a multivariable process fluid transmitter that is suitable for such environments and can provide all requisite process variables using a single device.

SUMMARY

A multivariable process fluid transmitter module includes a base having a pair of recesses. A pair of pedestals is provided with each pedestal being disposed in a respective recess and being coupled to a respective isolation diaphragm. At least one line pressure assembly is mounted proximate one of the pedestals. The at least one line pressure assembly couples a respective isolation diaphragm to a line pressure sensor. A differential pressure sensor has a sensing diaphragm fluidically coupled to the isolation diaphragms by a fill fluid. At least one additional sensor is disposed to sense a temperature of a process fluid. Circuitry is coupled to the line pressure sensor, the differential pressure sensor, and the at least one additional sensor to measure an electrical characteristic of each of the line pressure sensor, the differential pressure sensor, and the at least one additional sensor. The circuitry is configured to provide an indication of fluid flow based on the measured electrical characteristic of each of the line pressure sensor, the differential pressure sensor and the at least one additional sensor.

DETAILED DESCRIPTION OF ILLUSTRATIVE EMBODIMENTS

High pressure flow measurements using differential pressure across a primary element currently require at least two and sometimes three process variable transmitters to make the measurements. Lower pressure environments can use a single multivariable process fluid transmitter, such as those sold under the trade designations Model 3095 or 3051 SMV, available from Emerson Process Management, of Chanhassen, Minn., to measure differential pressure, line pressure and temperature in order to provide a fully compensated flow value. However, such devices are only rated to a MWP of 3626 psi. When a flow related value is required for a high pressure environment, defined herein as a MWP greater than 3626 psi and up to and including 15,000 psi MWP, another approach is required. Given the high pressure of subsea environments, at least some embodiments described herein include devices or portions thereof that are suitable for direct immersion in salt water. As defined herein, "suitable for immersion in salt water" means that the material will not corrode or otherwise be impermissibly degraded in the presence of salt water for a viable product lifetime. Examples of materials that are suitable for immersion in salt water include Alloy C276 available from Haynes International Inc., of Kokomo, Ind. under the trade designation Hastelloy C276;

Inconel alloy 625, available from The Special Metal Family of Companies of New Hartford, N.Y.; and Alloy C-22 available from Haynes International. Of particular interest is Alloy C276, which has the following chemical composition (by % weight): Molybdenum 15.0-17.0; Chromium 14.5-16.5; Iron 4.0-7.0; Tungsten 3.0-4.5; Cobalt 2.5 maximum; Manganese 1.0 maximum; Vanadium 0.35 maximum; Carbon 0.01 maximum; Phosphorus 0.04 maximum; Sulfur 0.03 maximum; Silicon 0.08 maximum; and balance Nickel.

Figure 1:
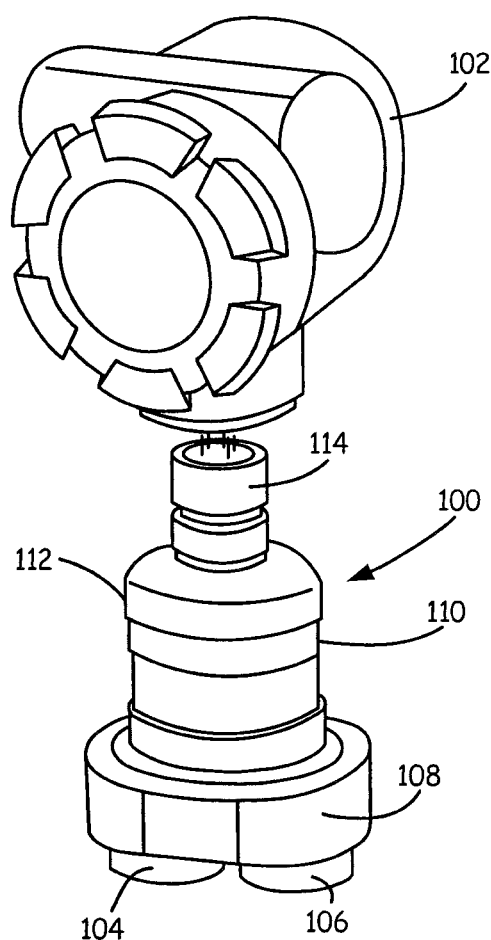
FIG. 1 is a diagrammatic view of a multivariable process fluid transmitter in accordance with an embodiment of the present invention.

As illustrated in FIG. 1, multivariable sensor module 100 includes sidewall 110 coupled to base portion 108 and to cap 112. An electrical feedthrough connector 114 is coupleable to electronics enclosure 102 and includes conductors to provide power to sensor module 100 as well as bidirectional communication. In some embodiments, module 100 may communicate over the same conductors through which it is powered.

Figure 2:
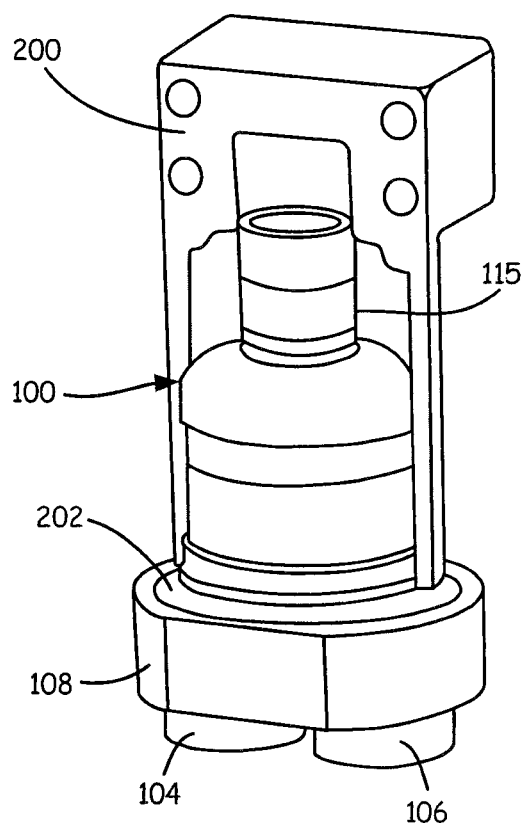
FIG. 2 is a diagrammatic view of the multivariable process fluid transmitter adapted for direct immersion in sea water.

FIG. 2 is a diagrammatic view of multivariable sensor module 100 (illustrated in FIG. 1) adapted for direct immersion in sea water. Specifically, the upper portion of module 100, proximate electrical connection point 115, is covered with a high-pressure bearing end cap 200 that is constructed from a material that is suitable for direct immersion in sea water. Moreover, the high pressures associated with exposure to sea water at extreme depths are borne by end cap 200 which maintains its shape and integrity while so subjected. Additionally, end cap 200 is preferably constructed from the same material as the bottom portion 108 of differential pressure sensor module 100. For example, if bottom portion 108 of module 100 is constructed from Alloy C276, it is preferred that end cap 200 also be constructed from Alloy C276. However, in embodiments where they are not constructed from the same materials, end cap 200 must be constructed from a material that is suitable for welding to portion 108 of module 100. This means that either the metallurgy of the two materials must be compatible enough for welding and/or the melting points of the two materials must be close enough to each other. An additional requirement for welding different metals is the metallurgy of the resulting weld (which is different than either starting material) must also be corrosion resistant. As can be appreciated from FIG. 2, sensor module 100 can be adapted for direct immersion in sea water relatively easily by simply welding end cap 200 directly to lower portion 108 at interface 202. Accessing electrical connection point 115 through end cap 200 can be performed in any suitable manner. For example, a high-pressure glass header may be used to pass conductors through end cap 200 in order to couple to connection point 115.

Figure 3:
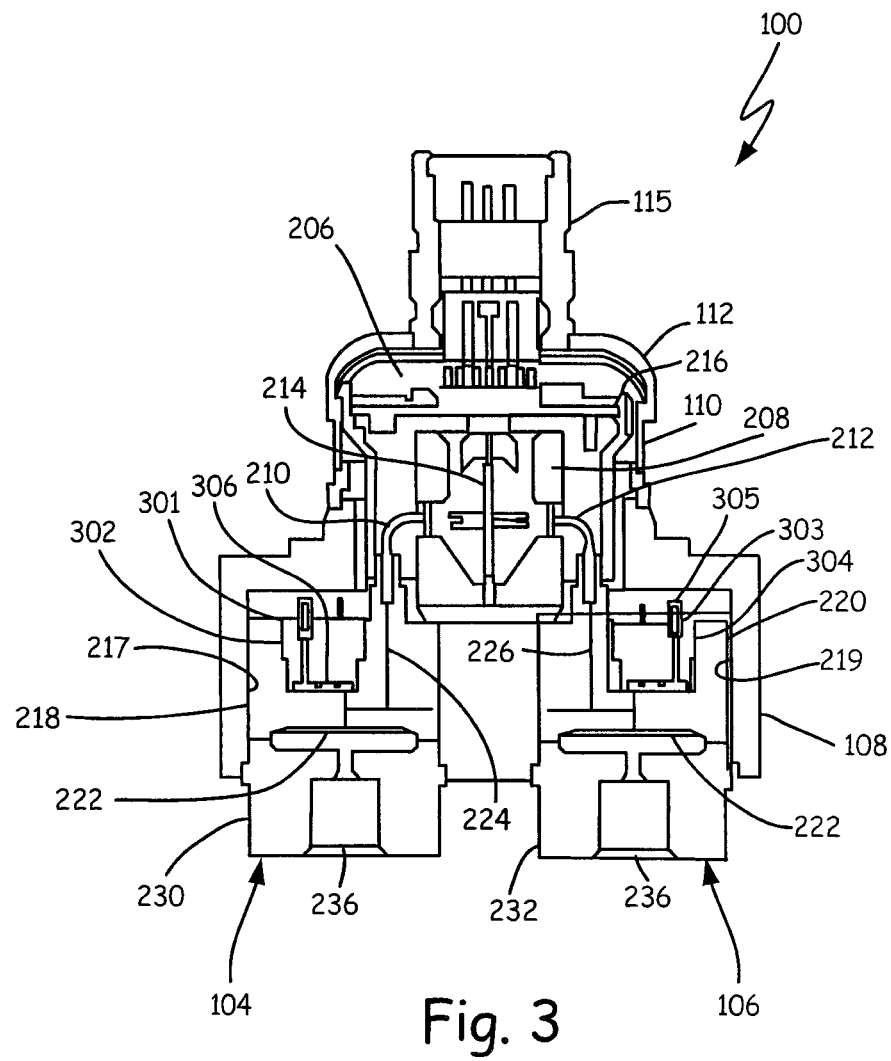
FIG. 3 is a diagrammatic cross sectional view of a multivariable process fluid transmitter in accordance with embodiment of the present invention.

FIG. 3 is a diagrammatic cross sectional view of sensor module 100 in accordance with embodiment of the present invention. While sensor module 100 is illustrated in FIG. 3 as being a co-planar sensor module, any suitable sensor module can be used in accordance with embodiments of the present invention. Module 100 includes a lower portion 108 that, in one embodiment, is constructed from a material suitable for immersion in salt water. While a number of materials may be suitable for immersion in salt water, one particularly suitable example is Alloy C276, set forth above. Base portion 108 is coupled to sidewall 110 and cap 112 to define a chamber 206 therein. Differential pressure sensor 208 is disposed in chamber 206 and has a pair of differential pressure sensor inputs 210, 212 that convey process pressure to deflectable diaphragm 214, which has an electrical characteristic, such as capacitance, that varies with diaphragm deflection. The electrical characteristic is measured, or otherwise transduced by circuitry 216 disposed proximate sensor 208. Circuitry 216 also conditions the capacitance measurement for transmission through electrical connection point 115. Circuitry 216 preferably includes a microprocessor as well as a process communication module for communicating over a process communication loop or segment. Examples of such communication include the Highway Addressable Remote Transducer (HART®) protocol or the FOUNDATION™ Fieldbus protocol. In some embodiments, module 100 may be powered over the same media through which it communicates.

As set forth above, in some embodiments, portions of module 100 may be adapted for immersion in salt water. Thus, the components must not only be capable resisting corrosion in such environments, but they must also be able to bear high pressure, such as 15000 psi. Base portion 108, in some embodiments, is adapted for immersion in salt water. However, in all embodiments, base portion is configured to bear a high line pressure up to and including 15,000 psi. Base portion 108 includes a pair of recesses 217, 219 each having a respective pedestal 218, 220. An isolator diaphragm 222 is coupled to each pedestal 218, 220 and conveys a respective process fluid pressure through a fill fluid, such as silicone oil, located in respective passageways 224, 226 to a respective input 210, 212 of differential pressure sensor 208. In this way, the two process fluid pressures are conveyed to differential pressure sensor 208 without allowing the process fluid to contact differential pressure sensor 208.

As illustrated in FIG. 3, each process fluid pressure port 104, 106 preferably includes a respective integrated process connector 230, 232 that is welded to base portion 108 in order to provide a corrosion-resistant, high-pressure coupling. Each weld extends about the entire circumference of each connector such that the weld not only robustly mounts the connector to base portion 108, but also seals the connector thereto. Each integrated process connector 230, 232 includes a process fluid pressure receiving aperture 236 that is suitable for exposure to process fluid at pressures up to 15,000 psi. Additionally, each pedestal 218, 220 is also preferably welded to its respective process connector 230, 232 before the process connectors 230, 232 are welded to portion 108. In this way, the critical process pressure retaining welds are protected inside the module from the corrosive effects of sea water exposure.

In accordance with an embodiment of the present invention, at least one of, and preferably both, pedestals 218, 220 includes a line pressure assembly as illustrated at respective reference numerals 302, 304. Line pressure assemblies 302, 304 are preferably welded to their respective pedestals 218, 220 as indicated at reference numerals 301, 303. Each line pressure assembly 302, 304 is fluidically coupled to respective passageways 224, 226. In this way, each line pressure assembly will be coupled to the respective line pressure at its respective process connector 230, 232. At least one line pressure assembly is coupled to a line pressure sensor, indicated diagrammatically in phantom at reference numeral 305. The line pressure sensor may be any suitable sensor, such as a commercially available capacitance-based pressure sensor. However, given the high line pressure required for embodiments of the present invention, the line pressure sensor is adapted for high pressure operation. One such adaptation includes the utilization of a thicker deflectable diaphragm in order to adjust the gage factor for operation up to 15,000 psi. The line pressure sensor is electrically coupled to circuitry 216 such that the multivariable sensor module can measure an electrical characteristic, such as capacitance, of the line pressure sensor to obtain an indication of line pressure. While only one line pressure sensor is required, it is preferred that the pedestals 218, 220 be identical. Moreover, it is preferred that even when a single line pressure sensor is used, that both line pressure assemblies 302, 304 be used. This reduces the number of unique components required to manufacture module 100.

In some embodiments, a temperature sensor, such as sensor 306 can be provided and coupled to electronics 216 in order to provide an electrical indication related to the temperature of the process fluid. Temperature sensor 306 can be any suitable type of temperature sensor, such as a resistance temperature detector (RTD), thermocouple, thermistor or any other suitable device that has an electrical characteristic or value that changes with temperature. Preferably, temperature sensor 306 is immersed in the fill fluid in the oil fill system. Due to its immersion in the oil fill system and its proximity to the isolator, temperature sensor 306 can be used, along with the differential pressure sensor signal and the line pressure sensor signal to provide a fully compensated flow measurement.

In another embodiment, the temperature sensor may be positioned at any other suitable position within module 100 and a second line pressure sensor could be located at the second line pressure assembly. The utilization of a second line pressure sensor provides redundancy such that if one of the line pressure sensor should fail, the second line pressure sensor could be used. Additionally, the two line pressure sensors can also be used to provide a verification of the differential pressure sensor output. Alternately, the two line pressure sensors could be used to provide a redundant differential pressure reading based on the difference between the two line pressure sensor measurements. While such a derived differential pressure sensor reading would be less accurate than a direct reading from the differential pressure sensor, it could still provide useful differential pressure information when the differential pressure sensor has failed or is otherwise unavailable. Such redundancy is particularly advantageous in subsea applications and/or other hostile or challenging environments where immediate access to the module is not a trivial endeavor.

In still another embodiment, a second line pressure sensor is used and is positioned at the second line pressure assembly. However, instead of being coupled to line pressure, the second line pressure sensor is sealed in a vacuum or near vacuum. Thus, the second line pressure sensor will react to non-pressure-related variables, such as temperature and/or stresses on the sensor module in much the same way as pressure sensor that is coupled to line pressure. As such, when the output of the second sensor is subtracted from the line pressure sensor, the result is a compensated for temperature effects. Thus, in this embodiment, a temperature sensor may not be necessary. Further, the output of the vacuum sealed sensor could be used to provide a direct indication of temperature.

Although the present invention has been described with reference to preferred embodiments, workers skilled in the art will recognize that changes may be made in form and detail without departing from the spirit and scope of the invention.

What is claimed is:

1. A multivariable process fluid transmitter module comprising:
    a base having a pair of recesses,
    a pair of pedestals, each pedestal being disposed in a respective recess and being coupled to a respective isolation diaphragm and configured to couple to a process fluid at a high line pressure;
    at least one line pressure assembly mounted proximate one of the pedestals, the at least one line pressure sensor assembly coupling a respective isolation diaphragm to a line pressure sensor;
    a differential pressure sensor having a sensing diaphragm fluidically coupled to the isolation diaphragms by a fill fluid;
    at least one additional sensor disposed in the process fluid transmitter module to sense a variable of the process fluid;
    circuitry coupled to the line pressure sensor, the differential pressure sensor, and the at least one additional sensor to measure an electrical characteristic of each of the line pressure sensor, the differential pressure sensor, and the at least one additional sensor; and
    wherein the circuitry is configured to provide an output related to the at least one line pressure sensor, the differential pressure sensor and the at least one additional sensor.

2. The multivariable process fluid transmitter module of claim 1, wherein the base is constructed from a material that is suitable for submersion in seawater.

3. The multivariable process fluid transmitter module of claim 2, wherein the material is Alloy C276.

4. The multivariable process fluid transmitter module of claim 1, wherein the at least one additional sensor is a temperature sensor.

5. The multivariable process fluid transmitter module of claim 4, wherein the at least one line pressure assembly includes a pair of line pressure assemblies, each line pressure assembly being mounted to a respective pedestal.

6. The multivariable process fluid transmitter module of claim 5, wherein the line pressure assemblies are welded to respective pedestals.

7. The multivariable process fluid transmitter module of claim 6, wherein the at least one additional sensor is a temperature sensor mounted to one of the line pressure assemblies.

8. The multivariable process fluid transmitter module of claim 6, wherein the at least one additional sensor comprises a second line pressure sensor coupled to the circuitry and mounted to a line pressure assembly wherein each line pressure sensor is coupled to a respective isolation diaphragm.

9. The multivariable process fluid transmitter module of claim 8, wherein the second line pressure sensor is used by the circuitry to provide a redundant line pressure sensor signal.

10. The multivariable process fluid transmitter module of claim 8, wherein the pair of line pressure sensors are used by the circuitry to provide a redundant differential pressure sensor signal.

11. The multivariable process fluid transmitter module of claim 6, wherein the at least one additional sensor comprises a second line pressure sensor sealed within one of the line pressure assemblies.

12. The multivariable process fluid transmitter module of claim 11, wherein the second line pressure sensor is maintained in a vacuum.

13. The multivariable process fluid transmitter module of claim 1, and further comprising a high pressure bearing end cap attached to the base.

14. The multivariable process fluid transmitter of claim 13, wherein the base and the high pressure bearing end cap are constructed from a material that is suitable for submersion in seawater.

15. The multivariable process fluid transmitter of claim 14, wherein the material is Alloy C276.

16. The multivariable process fluid transmitter of claim 1, wherein the output is an indication of fluid flow based on the measured characteristic of each of the line pressure sensor, the differential pressure sensor, and the at least one additional sensor.

\* \* \* \* \*